United States Patent
Schmaling et al.

(10) Patent No.: US 9,616,996 B2
(45) Date of Patent: Apr. 11, 2017

(54) STIFF INPLANE ELASTOMERIC ROTORHEAD

(71) Applicant: Sikorsky Aircraft Corporation, Stratford, CT (US)

(72) Inventors: David N. Schmaling, Southbury, CT (US); Frank P. D'Anna, Seymour, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 830 days.

(21) Appl. No.: 13/953,292

(22) Filed: Jul. 29, 2013

(65) Prior Publication Data

US 2015/0298801 A1    Oct. 22, 2015

(51) Int. Cl.
| | |
|---|---|
| *B64C 27/51* | (2006.01) |
| *B64C 27/54* | (2006.01) |
| *B64C 27/35* | (2006.01) |

(52) U.S. Cl.
CPC .............. *B64C 27/54* (2013.01); *B64C 27/35* (2013.01)

(58) Field of Classification Search
CPC ......... B64C 27/35; B64C 27/51; B64C 27/54; B64C 27/32; B64C 27/001; B64C 27/48; B64C 27/39
USPC .................................................. 416/106, 107
See application file for complete search history.

(56) References Cited

U.S. PATENT DOCUMENTS

| | | | | |
|---|---|---|---|---|
| 3,853,426 | A | * | 12/1974 | Rybicki .................. B64C 27/35 416/134 A |
| 4,361,415 | A | * | 11/1982 | Aubry ..................... B64C 27/51 416/134 A |
| 4,549,852 | A | | 10/1985 | Hibyan |
| 4,652,211 | A | * | 3/1987 | Castelli ................. B64C 27/322 416/107 |
| 4,695,226 | A | | 9/1987 | Marchitto et al. |
| 4,886,419 | A | | 12/1989 | McCafferty |
| 5,263,821 | A | * | 11/1993 | Noehren ................. B64C 27/33 415/115 |
| 5,636,970 | A | | 6/1997 | Certain |
| 5,913,659 | A | | 6/1999 | Doolin et al. |
| 6,769,872 | B2 | | 8/2004 | Torok et al. |
| 6,932,569 | B2 | | 8/2005 | Torok et al. |
| 8,123,483 | B2 | | 2/2012 | Beroul |
| 8,926,281 | B2 | * | 1/2015 | Stamps .................. B64C 27/35 416/134 A |

* cited by examiner

*Primary Examiner* — Gregory Anderson
*Assistant Examiner* — Jason Fountain
(74) *Attorney, Agent, or Firm* — Cantor Colburn LLP

(57) ABSTRACT

An aircraft rotor head is provided and includes a rotor hub including a central portion and radial arms extending outwardly from the central portion, blade retention yokes, each blade retention yoke being pivotably coupled to a corresponding one of the radial arms at one end and to a corresponding blade at another end and a lag restraint star rotatable about and translatable along the central portion. The lag restraint star is coupled to each of the blade retention yokes to facilitate uniform blade lead/lag and uniform blade coning.

20 Claims, 3 Drawing Sheets

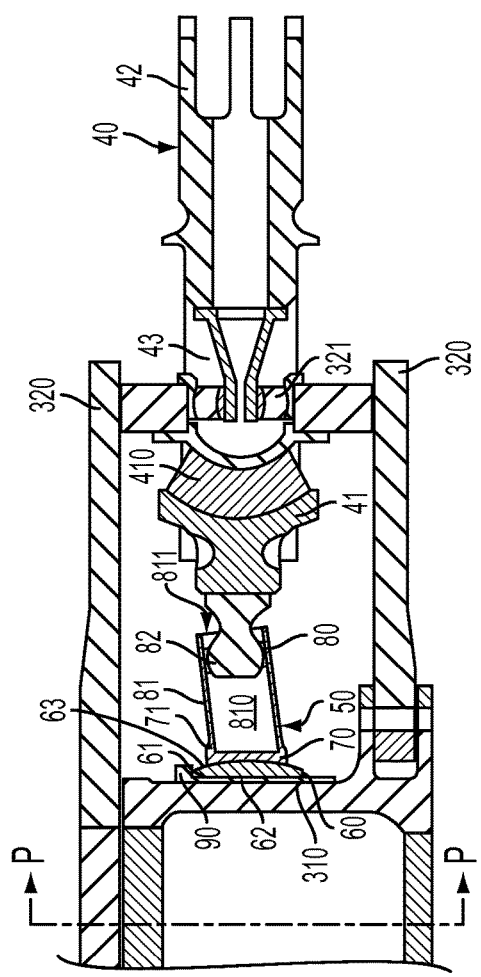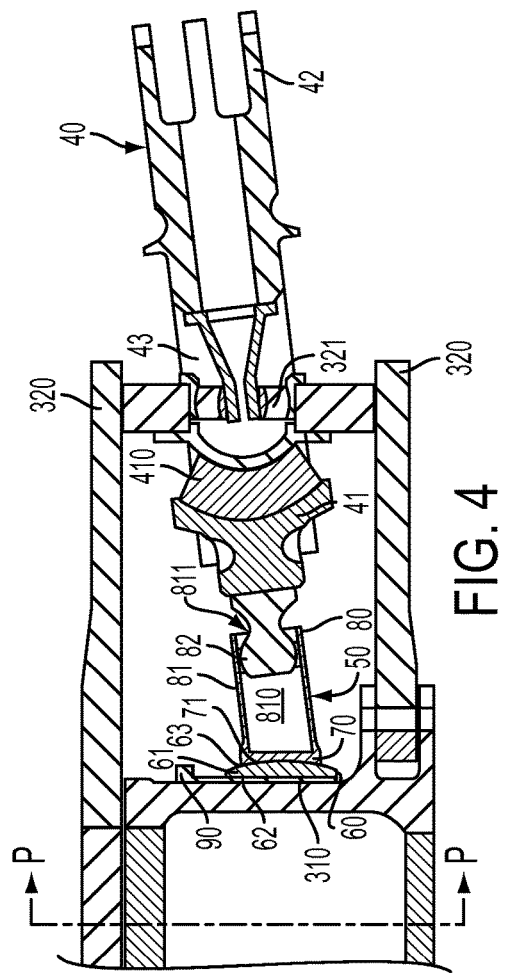

STIFF INPLANE ELASTOMERIC ROTORHEAD

BACKGROUND OF THE INVENTION

The subject matter disclosed herein relates to an aircraft rotor head and, more particularly to a stiff in-plane aircraft rotor head.

Fully articulated elastomeric rotor systems are used on many helicopters. These rotor systems utilize elastomeric bearings to accommodate blade flap, lead/lag and pitch motions. The elastomeric bearings are highly reliable, fail-safe (allowing on condition replacement) and low maintenance. The articulated design has the benefit of greatly reducing the flatwise and chordwise bending moments at the blade root end, but the system requires lead/lag dampers to prevent aircraft ground resonance. The dampers are prone to leakage and require frequent overhauls. They are also difficult to package in a low drag rotor system.

Stiff in-plane designs have been used but are typically constructed using lubricated bearings or composite flexural members to accommodate pitch and flap motions, while providing the required edgewise stiffness to achieve a $1^{st}$ chordwise elastic frequency greater than 1 per rev. These designs do not require dampers because of the high edgewise stiffness of the blades and blade retention and the resulting frequency placement. Accommodating the above-noted design constraints (i.e., the required edgewise stiffness and the $1^{st}$ chordwise elastic frequency greater than 1 per rev) with a low maintenance elastomeric rotor has been a continuing design challenge. Particularly, the need to carry blade centrifugal forces with an elastomeric bearing while accommodating pitch and flap and restricting lead/lag motions has posed significant difficulties.

BRIEF DESCRIPTION OF THE INVENTION

According to one aspect of the invention, an aircraft rotor head is provided and includes a rotor hub including a central portion and radial arms extending outwardly from the central portion, blade retention yokes, each blade retention yoke being pivotably coupled to a corresponding one of the radial arms at one end and to a corresponding blade at another end and a lag restraint star rotatable about and translatable along the central portion. The lag restraint star is coupled to each of the blade retention yokes to facilitate uniform blade lead/lag and uniform blade coning According to another aspect of the invention, an aircraft rotor head is provided and includes a rotor hub including a central portion and radial arms extending outwardly from the central portion, blade retention yokes, each blade retention yoke including a proximal portion, a distal portion coupled to a blade and an intermediate portion pivotably coupled to one of the radial arms and a lag restraint star. The lag restraint star includes a first hub element rotatable about and translatable along the central portion, a second hub element disposed adjacent to an exterior of the first hub element, the second hub element being rotatable about and along an exterior surface of the first hub element and receptacles extending outwardly from the second hub element. Each receptacle includes a tubular element and a bearing movably disposed within the tubular element and receptive of a proximal portion of one of the blade retention yokes.

According to yet another aspect of the invention, a lag restraint star of an aircraft rotor head is provided and includes a first hub element rotatable about and translatable along a poloidal axis thereof, a second hub element disposed adjacent to an exterior of the first hub element, the second hub element being rotatable about and along an exterior surface of the first hub element and receptacles extending outwardly from the second hub element. Each receptacle includes a tubular element and a bearing movably disposed within the tubular element and receptive of a blade retention assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a side view of a portion of the rotor hub of FIG. 2 in a drooping state; and FIG. 4 is a side view of the portion of the rotor hub of FIG. 2 in a coning state.

The detailed description explains embodiments of the invention, together with advantages and features, by way of example with reference to the drawings.

DETAILED DESCRIPTION OF THE INVENTION

As described below, a stiff in-plane elastomeric rotor system is provided and allows for a compact, low drag rotor system, and does not require dampers. The system includes fully articulated blade retention and a uniball device located around the center portion of the hub. The system further includes a receptacle for each blade to receive an inboard extending prong and bearing assembly. The uniball device can slide vertically and tilt in any direction, similar to a uniball bearing used in stationary swashplates, and allows all blades to cone in unison, to flap harmonically and to lead and lag in unison in response to applied main rotor torque. The system restricts opposing lead/lag motions between blades and essentially produces a rigid degree of freedom in the lead/lag direction. It is this constrained degree of freedom, combined with high blade edgewise stiffness, that removes the requirement for lead/lag dampers. The system may eliminate or at least reduce the need for blade lead/lag dampers and complicated centrifugally activated droop stops.

Figure 1:
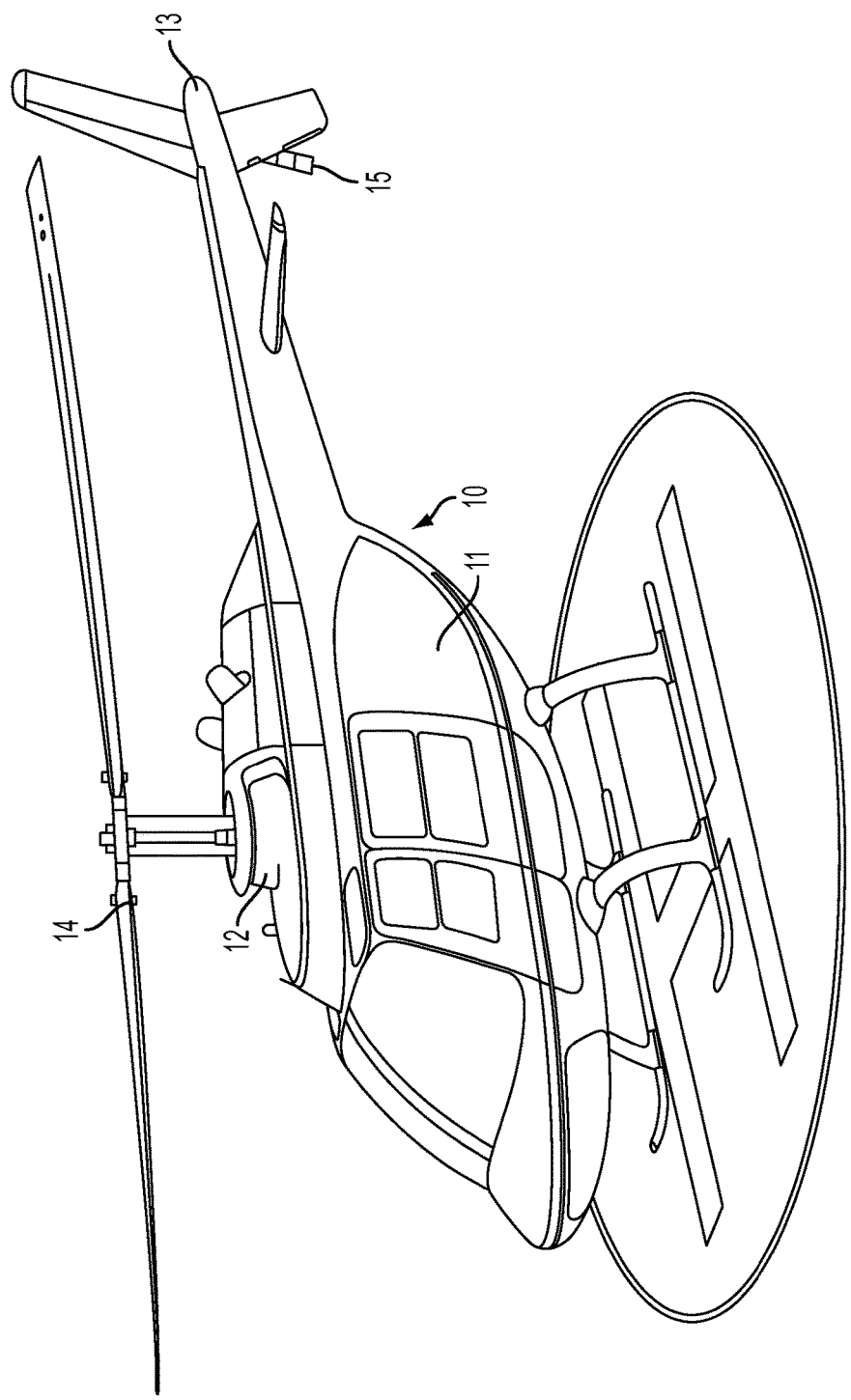
FIG. 1 is a schematic illustration of an aircraft in accordance with embodiments.

With reference to FIG. 1, an aircraft 10 is provided. The aircraft 10 may be a helicopter including a coaxial helicopter, a compound helicopter, a tilt rotor aircraft or a rotary machine. The aircraft 10 includes an airframe 11, which is formed to define a cabin, a main rotor section 12 and a tail section 13. An engine and a drive train are disposed within the airframe 11 and respectively generate and transmit torque to drive rotation of a main rotor 14, which is supportively disposed at the main rotor section 12, and to drive rotation of a tail rotor 15, which is supportively disposed at the tail section 13. The rotation of the main rotor 14 generates lift for the aircraft 10 and the rotation of the tail rotor 15 generates thrust and counteracts torque exerted on the airframe 11 by the main rotor 14. However, it is understood that the tail rotor 15 can also provide thrust as in a coaxial helicopter, or need not be used as in a title rotor aircraft.

Figure 2:
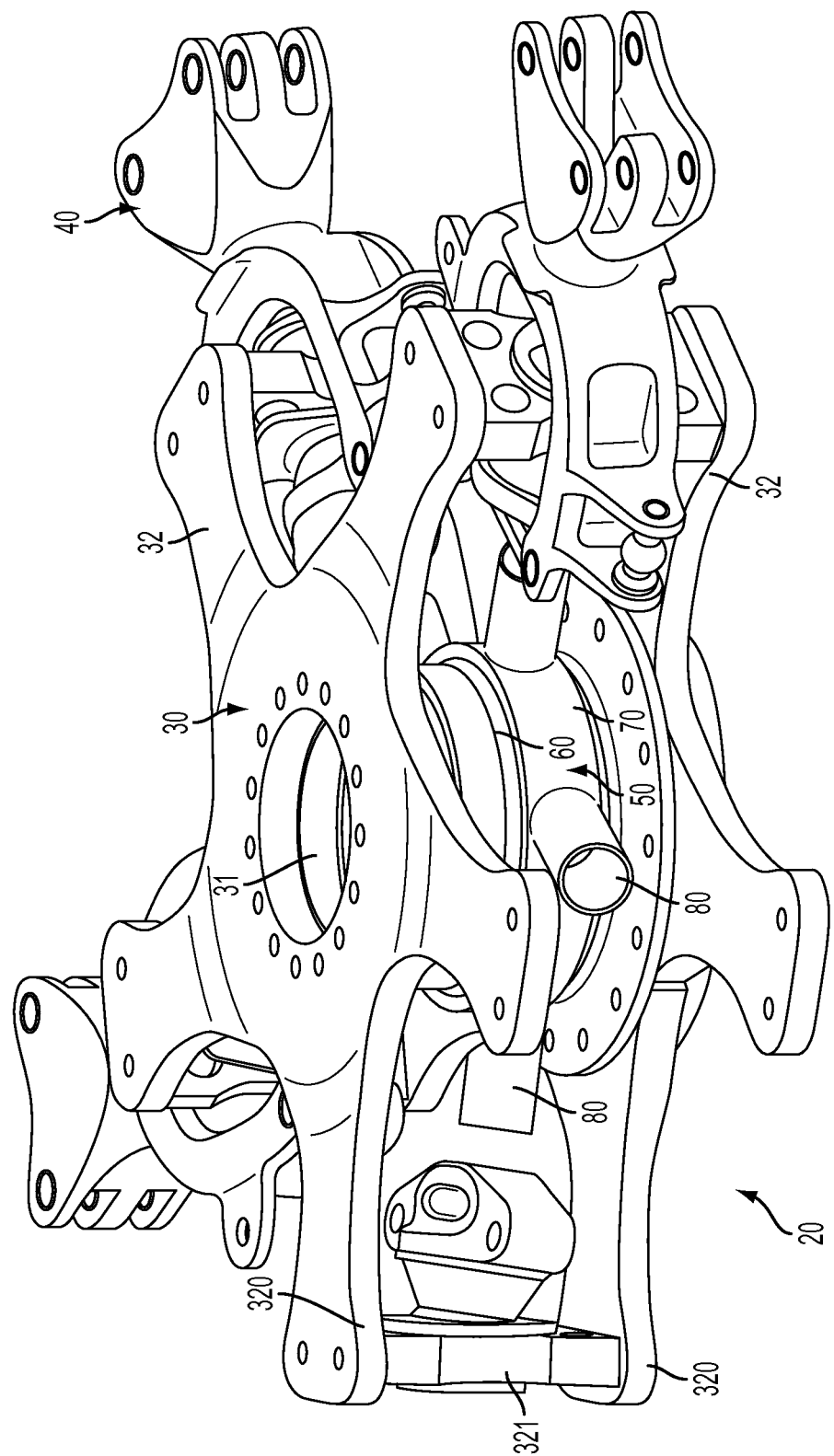
FIG. 2 is a perspective view of a rotor hub of the aircraft of FIG. 1 in accordance with embodiments.

With reference to FIGS. 2, 3 and 4, the main rotor section 12 may include a rotor head 20. The rotor head 20 includes a rotor hub 30, blade retention yokes 40 and a lag restraint star 50. The rotor hub 30 includes a central portion 31 and radial arms 32. The central portion 31 may include a substantially cylindrical exterior shaft surface 310 from which the radial arms 32 extend radially outwardly. The radial arms 32 may include a pair of radial arm elements 320 and a centering bearing 321, which is supportively disposed between distal ends of the radial arm elements 320. As shown in FIGS. 2, 3 and 4, a corresponding one of the blade retention yokes 40 may be pivotably coupled to the centering bearing 321. Each of the blade retention yokes 40 includes a proximal portion 41 (i.e., an inboard extending prong and bearing assembly), which may include a thrust bearing 410 and may be disposed proximate to the central portion 31. Each yoke 40 also includes a distal portion 42, which may be coupled to a blade of the main rotor 14 (see FIG. 1). An intermediate portion 43 is disposed between the proximal portion 41 and the distal portion 42. The pivotable coupling of the blade retention yokes 40 and the centering bearing 321 occurs at the intermediate portion 43 in the illustrated embodiment.

The centering bearing 321 is disposed to restrain movement of the blade retention yokes 40 in the axial and tangential directions relative to the central portion 31 of the rotor hub 30. The centering bearing 321 may be formed as a partially or fully spherical bearing and may be at least partially formed of elastomeric or compliant materials. The proximal portion 41 of each blade retention yoke 40 may include a thrust bearing 410. The thrust bearing 410 restrains radial movement of the corresponding blade retention yoke 40 and blade (see FIG. 1). The thrust bearing 410 may be partially or fully spherical and at least partially formed of elastomeric or compliant materials.

The lag restraint star 50 includes a first hub element 60, a second hub element 70 and receptacles 80. The first hub element 60 may be formed as a uniball component 61 with a substantially cylindrical interior surface 62 and at least a partially spherical exterior surface 63. The first hub element 60 may be disposed to be rotatable about a poloidal axis P thereof, which may be defined along a longitudinal axis of the central portion 31 of the rotor hub 30 (i.e., a rotational axis of the main rotor 14 of FIG. 1). The first hub element 60 may also be axially translatable along the substantially cylindrical exterior shaft surface 310 of the central portion 31. The second hub element 70 may be disposed adjacent to the exterior surface 63 of the first hub element 60 and may include a convex interior surface 71. The second hub element 70 may be rotatable about the first hub element 60 along the exterior surface 63. With the ability of the first hub element 60 to rotate and translate, as noted above, rotation of the second hub element 70 about the first hub element 60 results in the second hub element 70 being effectively rotatable and translatable about the substantially cylindrical exterior shaft surface 310.

Respective curvatures of the exterior surface 63 and the interior surface 71 may be substantially similar. However, this is not required and it will be understood that other configurations are possible. For example, ball bearings or other similar devices may be disposed between the first and second hub elements 60 and 70 whereby the second hub element 70 is rotatable about and along the exterior surface 63 regardless of whether the respective curvatures of the exterior surface 63 and the interior surface 71 are or are not substantially similar.

The receptacles 80 extend outwardly (i.e., radially outwardly) from the second hub element 70. Each receptacle 80 includes a tubular element 81 and a bearing 82. The tubular elements 81 each include a substantially cylindrical sidewall 810 and an open end 811 defined at a distal end of the sidewall 810. The bearing 82 may be a spherical bearing and may be at least partially formed of elastomeric or compliant materials. The bearing 82 may be movably disposed within the tubular element 81 and receptive of or otherwise coupled to a proximal portion 41 of the corresponding one of the blade retention yokes 40. While shown as being angled upward (i.e., pre-coned), it is understood that the tubular elements 81 could be substantially co-planar with a plane perpendicular to the axis of rotation for the rotor head 20.

In accordance with embodiments, movement of the bearing 82 within the tubular element 81 may have a radial component. Although not shown in the figures, it will be understood that one or more stoppers may be operably disposed in the tubular element 81 to limit the range of movement of the bearing 82 in the radial or any other dimension.

The rotor hub 30 may include any number of radial arms 32 that can be coupled to a corresponding number of blades. The lag restraint star 50 may include as many receptacles 80 as radial arms 32. In any case, the number of the radial arms 32 and the receptacles 80 may be substantially uniformly arranged about the central portion 31.

With reference to FIGS. 3 and 4, an operation of the lag restraint star 50 will now be described. As shown in FIG. 3, when the aircraft 10 is at rest or the main rotor 14 is rotating relatively slowly, the weight of the blades will tend to cause the blades and the blade retention yokes 40 to pivot downwardly about the centering bearing 321 (i.e., blade drooping). This downward pivoting causes the second hub element 70 to translate upwardly along the exterior surface 63 of the first hub element 60 and causes the first hub element 63 to translate upwardly along the substantially cylindrical exterior shaft surface 310 of the central portion 31.

By contrast, as shown in FIG. 4, when the aircraft 10 is in flight or the main rotor 14 is rotating at a relatively high speed, the blades and the blade retention yokes 40 may tend to pivot upwardly about the centering bearing 321 (i.e., coning of the blades). This upward pivoting causes the second hub element 70 to translate downwardly along the exterior surface 63 of the first hub element 60 and causes the first hub element 63 to translate downwardly along the substantially cylindrical exterior shaft surface 310 of the central portion 31.

A stopper 90 may be provided along the substantially cylindrical exterior shaft surface 310 to interfere with the upward translation of the first hub element 60 and to thereby prevent further pivoting of the blades and the blade retention yokes 40. With the stopper interfering with the translation of the first hub element 60, the tubular element 81 of each receptacle 80 may be disposed in an offset orientation with respect to the one of the blades and the blade retention yokes 40 (the tubular element 81 may be aligned with the one of the blade and the blade retention yokes 40 when the blades cone). A similar stopper may be but is not required to be placed at a lower end of the substantially cylindrical exterior shaft surface 310 to interfere with the downward translation of the first hub element 60 and to set a maximum coning angle for the blades). Further mechanical devices can be placed on either or both of the first hub element 60 and the second hub element 70 to limit other blade movements and orientations.

The movement (i.e., the radial movement) of the bearing 82 within the tubular element 81 is provided such that the bearing 82 always remains inside the tubular element 81 during the downward or upward pivoting of the blades and the blade retention yokes 40 about the centering bearing 321. In this way, the blades lead and lag together and cooperatively prevent lead/lag of any one independent blade. Similarly, the blades droop and cone together and prevent drooping and coning of any one independent blade. That is, lead/lag moments will be generated by the blades due to coriolis accelerations in response to blade flapping. These moments are reacted to and opposed by a force couple acting at the centering bearing 321 and the lag restraint star 50.

In accordance with embodiments, the rotor head 20 may be faired (i.e., housed in a fairing), which will create a clean environment to utilize self-lubricating bearings and the above-mentioned elastomeric bearings.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft rotor head, comprising:
    a rotor hub comprising a central portion having a longitudinal axis and radial arms extending outwardly from the central portion, each radial arm including a pair of radial arm elements and a bearing supportively disposed between the pair of radial arm elements;
    blade retention yokes, each blade retention yoke being pivotably coupled to the bearing of a corresponding pair of radial arm elements of one of the radial arms at one end and to a corresponding blade at another end; and
    a lag restraint star rotatable about the central portion and axially translatable between the pair of radial arm elements of each radial arm along the central portion with respect to the longitudinal axis, the lag restraint star being disposed radially between the central portion of the rotor hub and the blade retention yokes, and coupled to each of the blade retention yokes to facilitate uniform blade lead/lag and uniform blade coning.

2. The aircraft rotor head according to claim 1, wherein the rotor hub is configured to prevent blade droop beyond a predefined angle.

3. The aircraft rotor head according to claim 1, wherein the bearing of each of the radial arms is a centering bearing supportively disposed between distal ends of the radial arm elements.

4. The aircraft rotor head according to claim 1, wherein each blade retention yoke comprises a thrust bearing.

5. The aircraft rotor head according to claim 1, wherein the lag restraint star is coupled to each of the blade retention yokes via a spherical bearing.

6. An aircraft rotor head, comprising:
    a rotor hub comprising a central portion and radial arms extending outwardly from the central portion;
    blade retention yokes, each blade retention yoke comprising a proximal portion, a distal portion coupled to a blade and an intermediate portion pivotably coupled to one of the radial arms; and
    a lag restraint star comprising:
        a first hub element rotatable about and translatable along the central portion;
        a second hub element disposed adjacent to an exterior of the first hub element, the second hub element being rotatable about and along an exterior surface of the first hub element; and
        receptacles extending outwardly from the second hub element, each receptacle comprising a tubular element and a bearing movably disposed within the tubular element and receptive of a proximal portion of one of the blade retention yokes.

7. The aircraft according to claim 6, wherein the rotor hub comprises a number of the radial arms substantially uniformly arranged about the central portion, and wherein the lag restraint star comprises a corresponding number of the receptacles.

8. The aircraft according to claim 6, wherein the rotor hub comprises a stopper to interfere with first hub element translation.

9. The aircraft according to claim 8, wherein the tubular element of each receptacle is disposable in an offset orientation with respect to the one of the blade retention yokes with the stopper interfering with the first hub element translation.

10. The aircraft rotor head according to claim 6, wherein each of the radial arms comprises:
    a pair of radial arm elements; and
    a centering bearing to which one of the blade retention yokes is coupled and which is supportively disposed between distal ends of the radial arm elements.

11. The aircraft rotor head according to claim 6, wherein the proximal portion of each blade retention yoke comprises a thrust bearing.

12. The aircraft rotor head according to claim 6, wherein each bearing comprises a spherical bearing.

13. A lag restraint star of an aircraft rotor head, comprising:
    a first hub element rotatable about and translatable along a poloidal axis thereof;
    a second hub element disposed adjacent to an exterior of the first hub element, the second hub element being rotatable about and along an exterior surface of the first hub element; and
    receptacles extending outwardly from the second hub element, each receptacle comprising a tubular element and a bearing movably disposed within the tubular element and receptive of a blade retention assembly.

14. The lag restraint star according to claim 13, wherein the first and second hub elements each comprises at least one or more of aluminum and titanium, and wherein the first and second hub elements each further comprises a low friction coating.

15. The lag restraint star according to claim 13, wherein the first hub element comprises a uniball component.

16. The lag restraint star according to claim 13, wherein the first hub element comprises:
    a cylindrical interior surface; and
    the exterior surface, which is at least partially spherical.

17. The lag restraint star according to claim 16, wherein the second hub element comprises a convex interior surface to register with the exterior surface of the first hub element.

18. The lag restraint star according to claim 13, wherein the receptacles are substantially uniformly arranged about the poloidal axis.

19. The lag restraint star according to claim 13, wherein the receptacles extend radially outwardly from the second hub element.

20. The lag restraint star according to claim 13, wherein the bearing of each receptacle is radially movably within the tubular element.

* * * * *